(12) United States Patent
Bong

(10) Patent No.: US 8,056,015 B2
(45) Date of Patent: Nov. 8, 2011

(54) METHOD FOR DISPLAYING MESSAGE OF A MOBILE TERMINAL AND MOBILE TERMINAL USING THE SAME

(75) Inventor: Byung Eun Bong, Seoul (KR)

(73) Assignee: LG Electronics Inc., Seoul (KR)

( * ) Notice: Subject to any disclaimer, the term of this patent is extended or adjusted under 35 U.S.C. 154(b) by 784 days.

(21) Appl. No.: 12/134,730

(22) Filed: Jun. 6, 2008

(65) Prior Publication Data

US 2009/0061915 A1    Mar. 5, 2009

(30) Foreign Application Priority Data

Sep. 4, 2007    (KR) .................... 10-2007-0089428

(51) Int. Cl.
*G06F 3/048* (2006.01)
*H04K 3/00* (2006.01)

(52) U.S. Cl. ...................................... 715/810; 455/566
(58) Field of Classification Search .................. 715/810; 455/412.1, 466, 566
See application file for complete search history.

(56) References Cited

U.S. PATENT DOCUMENTS

2007/0072633 A1*  3/2007  Cheon et al. .................. 455/466
2007/0250583 A1* 10/2007  Hardy et al. .................. 709/206

FOREIGN PATENT DOCUMENTS

CN            1913546 A       2/2007

* cited by examiner

*Primary Examiner* — Lee Nguyen
(74) *Attorney, Agent, or Firm* — Birch, Stewart, Kolasch & Birch, LLP

(57) ABSTRACT

A method for displaying a message in a mobile terminal. The method includes selecting a message history option on an input unit of the mobile terminal, displaying a list of messages, and displaying a message type of at least one message included in the displayed list of messages.

28 Claims, 13 Drawing Sheets

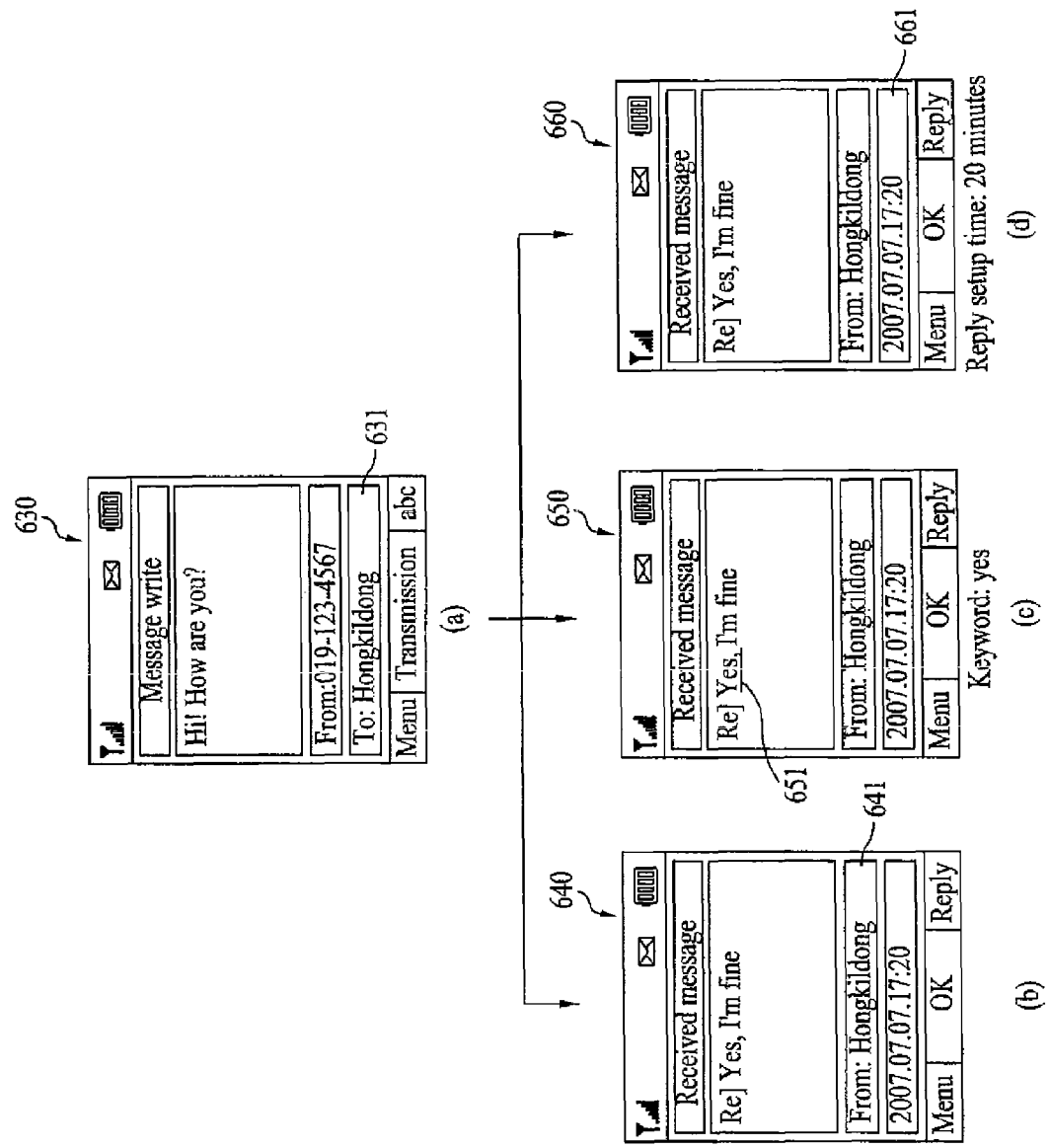

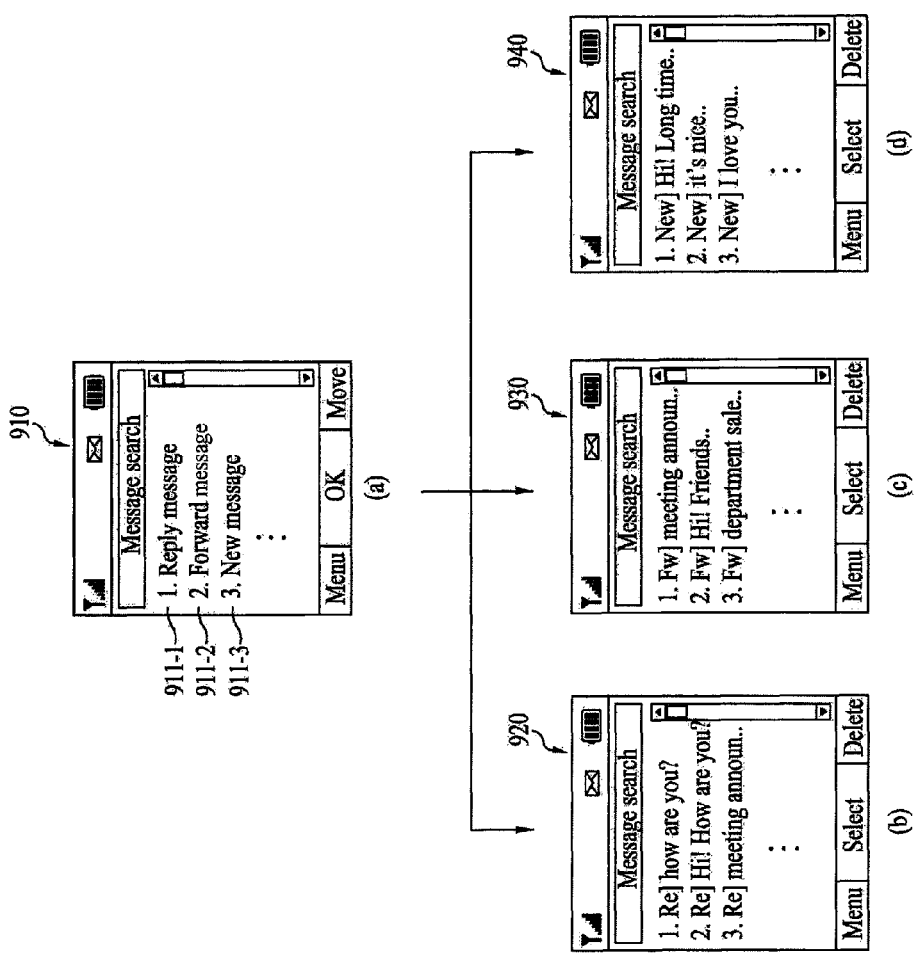

METHOD FOR DISPLAYING MESSAGE OF A MOBILE TERMINAL AND MOBILE TERMINAL USING THE SAME

CROSS REFERENCE TO RELATED APPLICATION

This application claims the benefit of the Korean Patent Application No. 10-2007-0089428, filed on Sep. 4, 2007, which is hereby incorporated by reference as if fully set forth herein.

BACKGROUND OF THE INVENTION

1. Field of the Invention

The present invention relates to a mobile terminal and corresponding method for displaying types of messages created, sent and received on the mobile terminal.

2. Discussion of the Related Art

Mobile terminals now provide many additional services beside the basic call service. For example, user's can now access the Internet, play games, watch videos, listen to music, capture images and videos, record audio files, etc. Mobile terminals also now provide broadcasting programs such that user can watch television shows, sporting programs, videos etc.

Users can also send and receive text and email messages using their mobile terminal. However, because the user often sends multiple text messages, emails, etc., it is difficult for the user to effectively manage messages they have created, sent or received on their mobile terminal

SUMMARY OF THE INVENTION

Accordingly, one object of the present invention is to address the above-noted and other problems.

Another object of the present invention is to provide a mobile terminal and corresponding method for displaying a message list that includes a message type per message.

Another object of the present invention is to provide a mobile terminal and corresponding method for displaying a message history related to a specific message.

Still another object of the present invention is to provide a mobile terminal and corresponding method for displaying a message history related to a transmitted and received message.

To achieve these objects and other advantages and in accordance with the purpose of the invention, as embodied and broadly described herein, the present invention provides in one aspect a method for displaying a message in a mobile terminal. The method includes selecting a message history option on an input unit of the mobile terminal, displaying a list of messages, and displaying a message type of at least one message included in the displayed list of messages.

In another aspect, the present invention provides a mobile terminal including a communication unit configured to wirelessly communication with at least one other terminal, a display unit configured to display information, an input unit configured to input information into the mobile terminal, and a control unit configured to control the display unit to display a list of messages, and to display a message type of at least one message included in the displayed list of messages based on an message history instruction input on the input unit.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

FIG. 6A(b) is an overview of a data structure of the message received in FIG. 6A(a);

FIG. 6B are overviews of display screens illustrating a method of identifying different message types of a received message according to an embodiment of the present invention;

FIG. 9 is an overview of display screens displaying a message history using a message type list in a mobile terminal according to one embodiment of the present invention.

DETAILED DESCRIPTION OF THE INVENTION

Reference will now be made in detail to the preferred embodiments of the present invention, examples of which are illustrated in the accompanying drawings.

Figure 1:
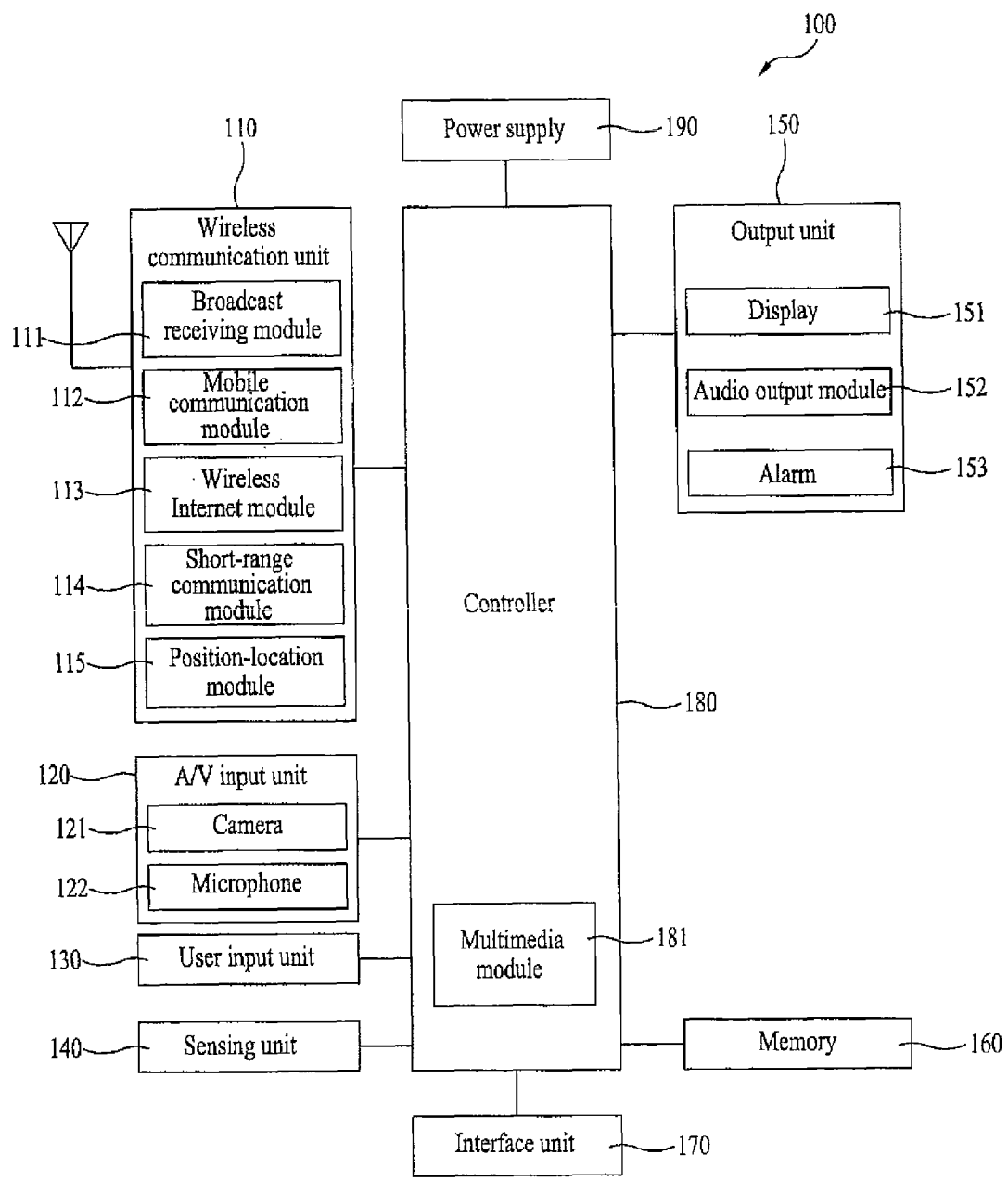
FIG. 1 is a block diagram of a mobile terminal according to an embodiment of the present invention.

FIG. 1 is a block diagram of a mobile terminal 100 according to an embodiment of the present invention. As shown, the mobile terminal 100 includes a wireless communication unit 110 having one or more components which permits wireless communication between the mobile terminal 100 and a wireless communication system or network within which the mobile terminal is located.

For example, the wireless communication unit 110 includes a broadcast receiving module 111 that receives a broadcast signal and/or broadcast associated information from an external broadcast managing entity via a broadcast channel. The broadcast channel may include a satellite channel and a terrestrial channel.

In addition, the broadcast managing entity generally refers to a system which transmits a broadcast signal and/or broadcast associated information. Examples of broadcast associated information include information associated with a broadcast channel, a broadcast program, a broadcast service provider, etc. For instance, broadcast associated information may include an electronic program guide (EPG) of digital multimedia broadcasting (DMB) and electronic service guide (ESG) of digital video broadcast-handheld (DVB-H).

In addition, the broadcast signal may be implemented as a TV broadcast signal, a radio broadcast signal, and a data broadcast signal, among others. The broadcast signal may further include a broadcast signal combined with a TV or radio broadcast signal.

The broadcast receiving module 111 is also configured to receive broadcast signals transmitted from various types of broadcast systems. For example, such broadcasting systems include the digital multimedia broadcasting-terrestrial (DMB-T) system, the digital multimedia broadcasting-satellite (DMB-S) system, the digital video broadcast-handheld (DVB-H) system, the data broadcasting system known as media forward link only (MediaFLO®) and the integrated services digital broadcast-terrestrial (ISDB-T) system among others. Receiving multicast signals is also possible. Further, data received by the broadcast receiving module 111 may be stored in a suitable device, such as a memory 160.

The wireless communication unit 110 also includes a mobile communication module 112 that transmits/receives wireless signals to/from one or more network entities (e.g., base station, Node-B). Such signals may represent audio, video, multimedia, control signaling, and data, among others.

Also included is a wireless Internet module 113 that supports Internet access for the mobile terminal. The module 113 may be internally or externally coupled to the terminal. The wireless communication unit 110 also includes a short-range communication module 114 that facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

A position-location module 115 is also included in the wireless communication unit 110 and identifies or otherwise obtains the location of the mobile terminal 100. The position-location module 115 may be implemented using global positioning system (GPS) components which cooperate with associated satellites, network components, and combinations thereof.

In addition, as shown in FIG. 1, the mobile terminal 100 also includes an Audio/video (A/V) input unit 120 that provides audio or video signals to the mobile terminal 100. As shown, the A/V input unit 120 includes a camera 121 and a microphone 122. The camera 121 receives and processes image frames of still pictures or video.

Further, the microphone 122 receives an external audio signal while the portable device is in a particular mode, such as a phone call mode, recording mode and voice recognition mode. The received audio signal is then processed and converted into digital data. Also, the portable device, and in particular, the A/V input unit 120, typically includes assorted noise removing algorithms to remove noise generated in the course of receiving the external audio signal. In addition, data generated by the A/V input unit 120 may be stored in the memory 160, utilized by an output unit 150, or transmitted via one or more modules of the communication unit 110. If desired, two or more microphones and/or cameras may be used.

The mobile terminal 100 also includes a user input unit 130 that generates input data responsive to user manipulation of an associated input device or devices. Examples of such devices include a keypad, a dome switch, a touchpad (e.g., static pressure/capacitance), a jog wheel and a jog switch. A specific example is one in which the user input unit 130 is configured as a touchpad in cooperation with a touch screen display, which will be described in more detail below.

A sensing unit 140 is also included in the mobile terminal 100 and provides status measurements of various aspects of the mobile terminal 100. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100, etc.

As an example, when the mobile terminal 100 is a slide-type mobile terminal, the sensing unit 140 may sense whether a sliding portion of the mobile terminal 100 is open or closed. Other examples include the sensing unit 140 sensing the presence or absence of power provided by a power supply 190, the presence or absence of a coupling or other connection between an interface unit 170 and an external device, etc.

Further, the interface unit 170 is often implemented to couple the mobile terminal 100 with external devices. Typical external devices include wired/wireless headphones, external chargers, power supplies, storage devices configured to store data (e.g., audio, video, pictures, etc.), earphones, and microphones, among others. In addition, the interface unit 170 may be configured using a wired/wireless data port, a card socket (e.g., for coupling to a memory card, a subscriber identity module (SIM) card, a user identity module (UIM) card, a removable user identity module (RUIM) card, etc.), audio input/output ports and video input/output ports.

The output unit 150 generally includes various components which support the output requirements of the mobile terminal 100. The mobile terminal 100 also includes a display 151 that visually displays information associated with the mobile terminal 100. For instance, if the mobile terminal 100 is operating in a phone call mode, the display 151 will generally provide a user interface or graphical user interface which includes information associated with placing, conducting, and terminating a phone call. As another example, if the mobile terminal 100 is in a video call mode or a photographing mode, the display 151 may additionally or alternatively display images which are associated with these modes.

Further, the display 151 also preferably includes a touch screen working in cooperation with an input device, such as a touchpad. This configuration permits the display 151 to function both as an output device and an input device. In addition, the display 151 may be implemented using display technologies including, for example, a liquid crystal display (LCD), a thin film transistor-liquid crystal display (TFT-LCD), an organic light-emitting diode display (OLED), a flexible display and a three-dimensional display.

The mobile terminal 100 may also include one or more of such displays. An example of a two-display embodiment is one in which one display is configured as an internal display (viewable when the terminal is in an opened position) and a second display configured as an external display (viewable in both the open and closed positions).

FIG. 1 further shows the output unit 150 having an audio output module 152 which supports the audio output requirements of the mobile terminal 100. The audio output module 152 is often implemented using one or more speakers, buzzers, other audio producing devices, and combinations thereof.

Further, the audio output module 152 functions in various modes including a call-receiving mode, a call-placing mode, a recording mode, a voice recognition mode and a broadcast reception mode. During operation, the audio output module 152 outputs audio relating to a particular function (e.g., call received, message received, and errors).

In addition, the output unit 150 is further shown having an alarm 153, which is used to signal or otherwise identify the occurrence of a particular event associated with the mobile terminal 100. Typical events include a call received, a message received and user input received. An example of such output includes the providing of tactile sensations (e.g., vibration) to a user. For instance, the alarm 153 may be configured to vibrate responsive to the mobile terminal 100 receiving a call or message.

As another example, a vibration is provided by the alarm 153 responsive to receiving user input at the mobile terminal 100, thus providing a tactile feedback mechanism. Further, the various outputs provided by the components of the output unit 150 may be separately performed, or such output may be performed using any combination of such components.

In addition, the memory 160 is generally used to store various types of data to support the processing, control, and storage requirements of the mobile terminal 100. Examples of such data include program instructions for applications operating on the mobile terminal 100, call history, contact data, phonebook data, messages, pictures, video, etc.

Further, the memory 160 shown in FIG. 1 may be implemented using any type or combination of suitable volatile and non-volatile memory or storage devices including random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, card-type memory, or other similar memory or data storage device.

The terminal 100 also includes a controller 180 that typically controls the overall operations of the mobile terminal 100. For instance, the controller 180 performs the control and processing associated with voice calls, data communications, instant message communications, video calls, camera operations and recording operations. As shown in FIG. 1, the controller 180 may also include a multimedia module 181 for providing multimedia playback functions. The multimedia module 181 may be configured as part of the controller 180, or may be implemented as a separate component.

In addition, a power supply 190 provides power used by the various components for the portable device. The provided power may be internal power, external power, or combinations thereof.

Figure 2:
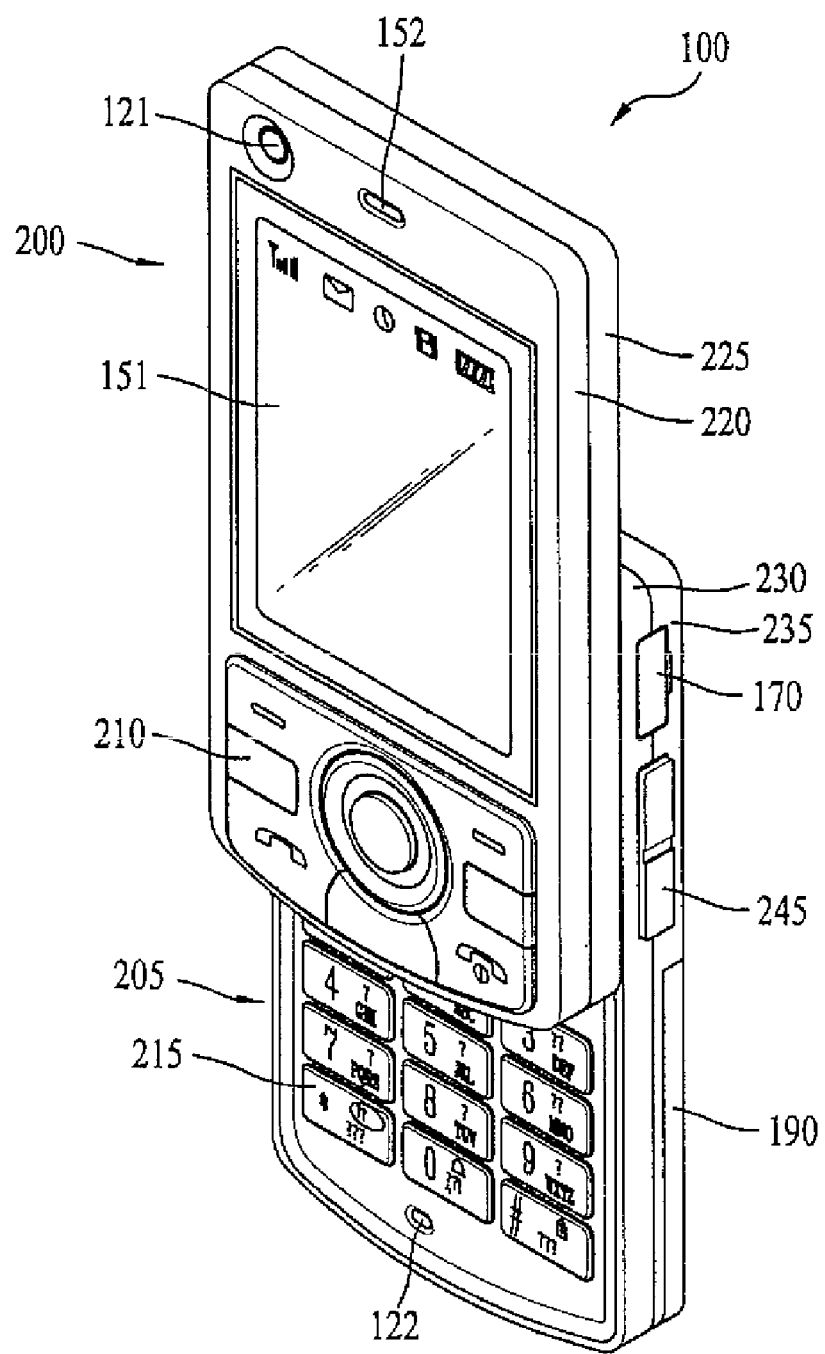
FIG. 2 is a front perspective view of a mobile terminal according to an embodiment of the present invention.

Next, FIG. 2 is a front side view of the mobile terminal 100 according to an embodiment of the present invention. As shown in FIG. 2, the mobile terminal 100 includes a first body 200 configured to slideably cooperate with a second body 205. The user input unit 130 described in FIG. 1 may include a first input unit such as function keys 210, a second input unit such as a keypad 215, and a third input unit such as side keys 245.

The function keys 210 are associated with the first body 200, and the keypad 215 is associated with the second body 205. The keypad 215 includes various keys (e.g., numbers, characters, and symbols) to enable a user to place a call, prepare a text or multimedia message, and otherwise operate the mobile terminal 100.

In addition, the first body 200 slides relative to the second body 205 between open and closed positions. In a closed position, the first body 200 is positioned over the second body 205 in such a manner that the keypad 215 is substantially or completely obscured by the first body 200. In the open position, user access to the keypad 215, as well as the display 151 and function keys 210, is possible. The function keys 210 are convenient to a user for entering commands such as start, stop and scroll commands.

Further, the mobile terminal 100 is operable in either a standby mode (e.g., able to receive a call or message, receive and respond to network control signaling), or an active call mode. Typically, the mobile terminal 100 functions in a standby mode when in the closed position, and an active mode when in the open position. However, the mode configuration may be changed as required or desired.

In addition, the first body 200 is formed from a first case 220 and a second case 225, and the second body 205 is formed from a first case 230 and a second case 235. The first and second cases are preferably formed from a suitably ridge material such as injection molded plastic, or formed using metallic material such as stainless steel (STS) and titanium (Ti).

If desired, one or more intermediate cases may be provided between the first and second cases of one or both of the first and second bodies 200 and 205. In addition, the first and second bodies 200 and 205 are typically sized to receive electronic components used to support the operation of the mobile terminal 100.

Also, the first body 200 includes the camera 121 and the audio output unit 152, which is configured as a speaker, positioned relative to the display 151. The camera 121 may also be constructed in such a manner that it can be selectively positioned (e.g., rotated, swiveled, etc.) relative to the first body 200.

Further, the function keys 210 are positioned adjacent to a lower side of the display 151. As discussed above, the display 151 can be implemented as an LCD or OLED. The display 151 may also be configured as a touch screen having an underlying touchpad which generates signals responsive to user contact (e.g., finger, stylus, etc.) with the touch screen.

Also, the second body 205 includes the microphone 122 positioned adjacent to the keypad 215, and side keys 245, which are one type of a user input unit, positioned along the side of the second body 205. Preferably, the side keys 245 are configured as hot keys, such that the side keys 245 are associated with a particular function of the mobile terminal 100. As shown, the interface unit 170 is positioned adjacent to the side keys 245, and the power supply 190 in a form of a battery is located on a lower portion of the second body 205.

Figure 3:
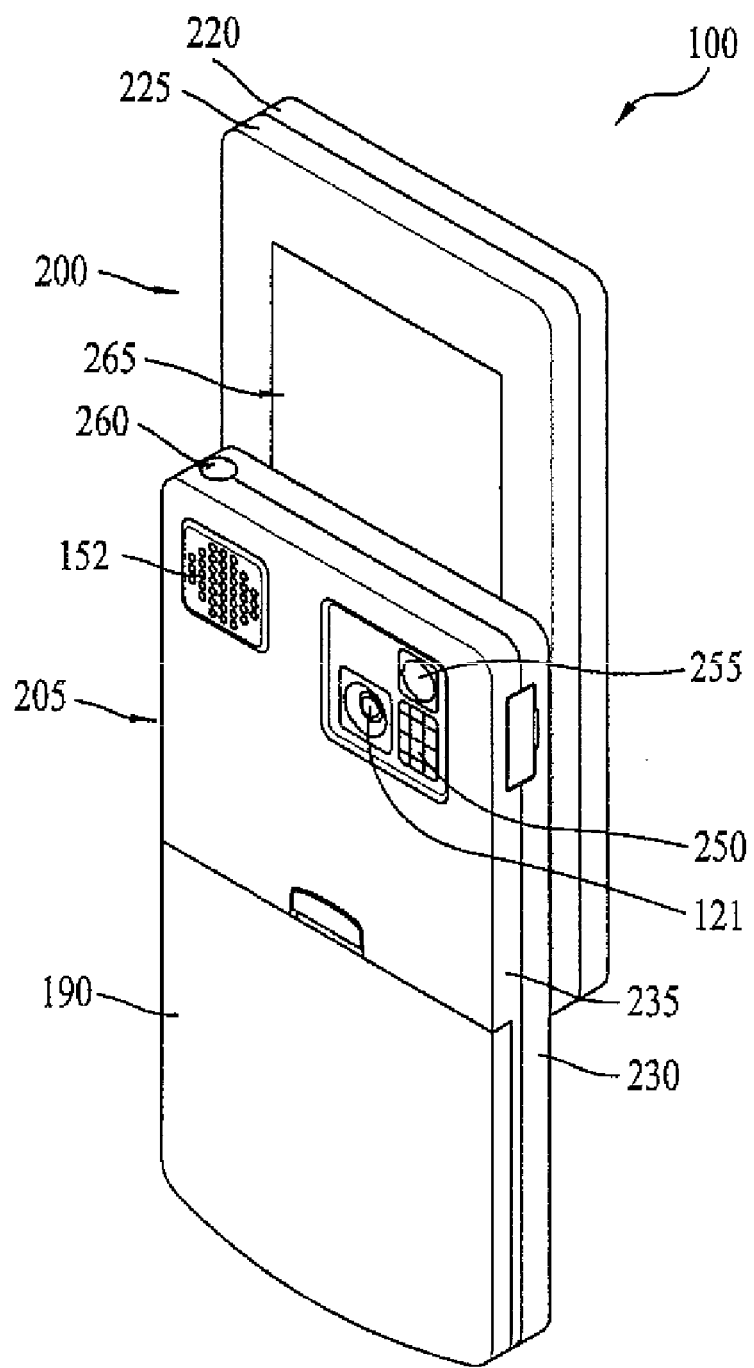
FIG. 3 is a rear perspective view of the mobile terminal shown in FIG. 2.

FIG. 3 is a rear side view of the mobile terminal 100 shown in FIG. 2. As shown in FIG. 3, the second body 205 includes the camera 121, and an associated flash 250 and mirror 255. The flash 250 operates in conjunction with the camera 121 of the second body 205, and the mirror 255 is useful for assisting a user to position the camera 121 in a self-portrait mode. In addition, the camera 121 of the second body 205 faces a direction which is opposite to a direction faced by the camera 121 of the first body 200 shown in FIG. 2.

In addition, each of the cameras 121 of the first and second bodies 200 and 205 may have the same or different capabilities. For example, in one embodiment, the camera 121 of the first body 200 operates with a relatively lower resolution than the camera 121 of the second body 205. Such an arrangement works well during a video conference call, for example, in which reverse link bandwidth capabilities may be limited. Further, the relatively higher resolution of the camera 121 of the second body 205 (FIG. 3) is useful for obtaining higher quality pictures for later use.

The second body 205 also includes the audio output module 152 configured as a speaker, and which is located on an upper side of the second body 205. The audio output modules of the first and second bodies 200 and 205 may also cooperate together to provide stereo output. Moreover, either or both of these audio output modules may be configured to operate as a speakerphone.

The terminal 100 also includes a broadcast signal receiving antenna 260 located at an upper end of the second body 205. The antenna 260 functions in cooperation with the broadcast receiving module 111 (FIG. 1). If desired, the antenna 260 may be fixed or configured to retract into the second body 205. Further, the rear side of the first body 200 includes a slide module 265, which slideably couples with a corresponding slide module located on the front side of the second body 205.

In addition, the illustrated arrangement of the various components of the first and second bodies 200 and 205 may be modified as required or desired. In general, some or all of the components of one body may alternatively be implemented on the other body. Further, the location and relative positioning of such components may be positioned at locations which differ from those shown by the representative figures.

In addition, the mobile terminal 100 of FIGS. 1-3 may be configured to operate within a communication system which transmits data via frames or packets, including both wireless and wireline communication systems, and satellite-based communication systems. Such communication systems utilize different air interfaces and/or physical layers.

Examples of such air interfaces utilized by the communication systems include, for example, frequency division multiple access (FOMA), time division multiple access (TDMA), code division multiple access (COMA), and universal mobile telecommunications system (UMTS), the long term evolution (LTE) of the UMTS, and the global system for mobile communications (GSM). By way of a non-limiting example only, further description will relate to a CDMA communication system, but such teachings apply equally to other system types.

Figure 4:
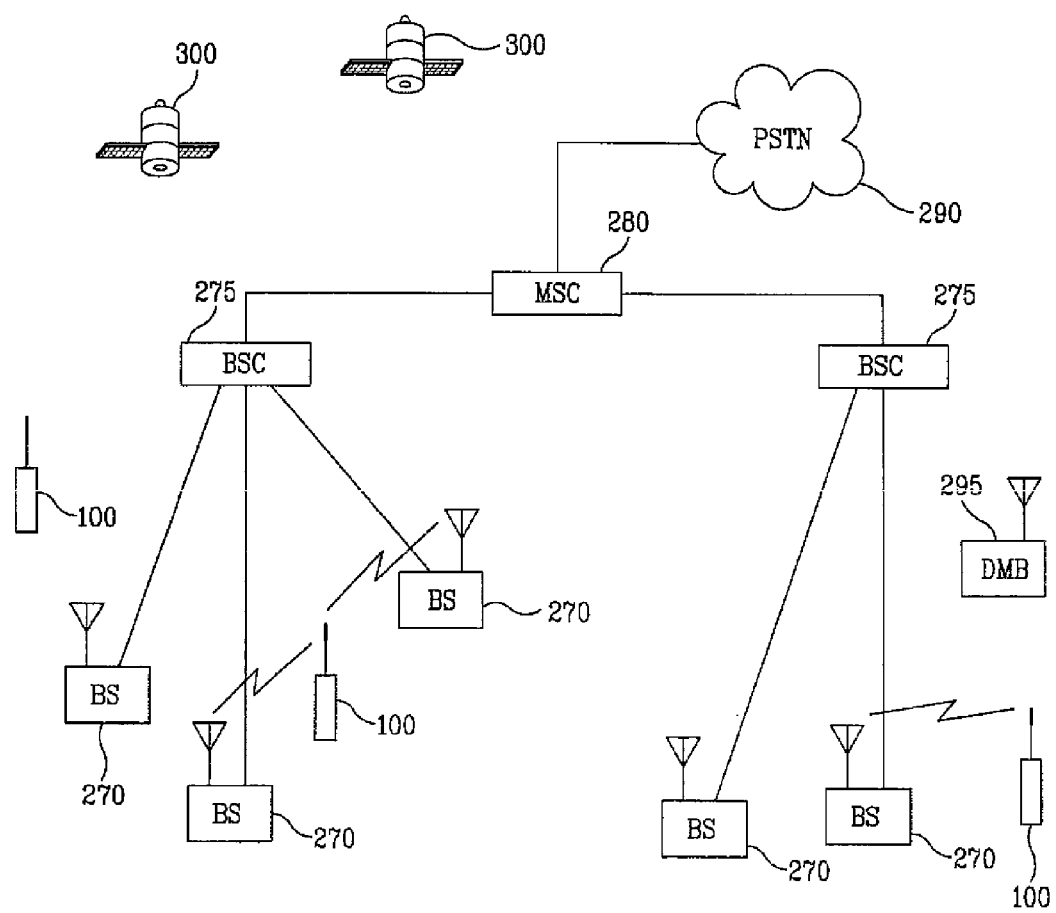
FIG. 4 is a block diagram of a CDMA wireless communication system operable with the mobile terminal of FIGS. 1-3.

Next, FIG. 4 illustrates a CDMA wireless communication system having a plurality of mobile terminals 100, a plurality of base stations 270, a plurality of base station controllers (BSCs) 275, and a mobile switching center (MSC) 280.

The MSC 280 is configured to interface with a public switch telephone network (PSTN) 290, and the MSC 280 is also configured to interface with the BSCs 275. Further, the BSCs 275 are coupled to the base stations 270 via backhaul lines. In addition, the backhaul lines may be configured in accordance with any of several interfaces including, for example, E1/T1, ATM, IP, PPP, Frame Relay, HDSL, ADSL, or xDSL. Further, the system may include more than two BSCs 275.

Also, each base station 270 may include one or more sectors, each sector having an omnidirectional antenna or an antenna pointed in a particular direction radially away from the base station 270. Alternatively, each sector may include two antennas for diversity reception. In addition, each base station 270 may be configured to support a plurality of frequency assignments, with each frequency assignment having a particular spectrum (e.g., 1.25 MHz, 5 MHz).

The intersection of a sector and frequency assignment may be referred to as a CDMA channel. The base stations 270 may also be referred to as base station transceiver subsystems (BTSs). In some instances, the term "base station" may be used to refer collectively to a BSC 275, and one or more base stations 270.

The base stations 270 may also be denoted as "cell sites." Alternatively, individual sectors of a given base station 270 may be referred to as cell sites. Further, a terrestrial digital multimedia broadcasting (DMB) transmitter 295 is shown broadcasting to mobile terminals 100 operating within the system.

In addition, the broadcast receiving module 111 (FIG. 1) of the mobile terminal 100 is typically configured to receive broadcast signals transmitted by the DMB transmitter 295. Similar arrangements may be implemented for other types of broadcast and multicast signaling as discussed above.

FIG. 4 further illustrates several global positioning system (GPS) satellites 300. Such satellites facilitate locating the position of some or all of the mobile terminals 100. In FIG. 4, two satellites are shown, but positioning information may be obtained with greater or fewer satellites.

In addition, the position-location module 115 (FIG. 1) of the mobile terminal 100 is typically configured to cooperate with the satellites 300 to obtain desired position information However, other types of position detection technology, such as location technology that may be used in addition to or instead of GPS location technology, may alternatively be implemented. Some or all of the GPS satellites 300 may alternatively or additionally be configured to provide satellite DMB transmissions.

Further, during typical operation of the wireless communication system, the base stations 270 receive sets of reverse-link signals from various mobile terminals 100. The mobile terminals 100 engage in calls, messaging, and other communications.

In addition, each reverse-link signal received by a given base station 270 is processed within that base station 270, and the resulting data is forwarded to an associated BSC 275. The BSC 275 provides call resource allocation and mobility management functionality including soft handoffs between the base stations 270.

Further, the BSCs 275 also route the received data to the MSC 280, which provides additional routing services for interfacing with the PSTN 290. Similarly, the PSTN interfaces with the MSC 280, and the MSC 280 interfaces with the BSCs 275. The BSCs 275 also control the base stations 270 to transmit sets of forward-link signals to the mobile terminals 100.

In the following description, a control method applicable to the above-configured mobile terminal 100 is explained with respect to various embodiments. However, the following embodiments can be implemented independently or through combinations thereof. In addition, in the following description, it is assumed that the display 151 includes a touch screen. Further, the touch screen or its screen will be indicated by the reference number '400'.

Figure 5:
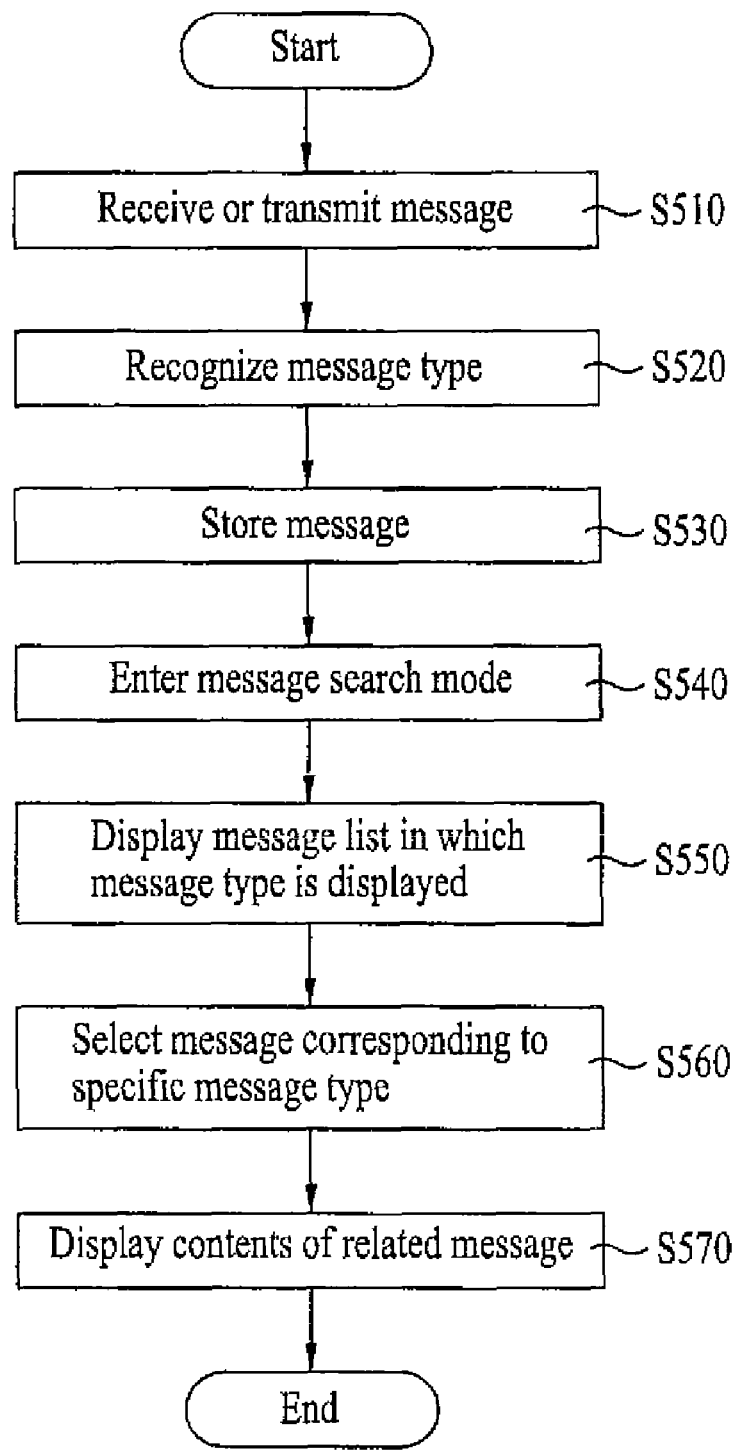
FIG. 5 is a flowchart illustrating a method for displaying a message in a mobile terminal according to one embodiment of the present invention.

FIG. 5 is a flowchart illustrating a method for displaying a message in a mobile terminal according to an embodiment of the present invention. FIG. 1 will also be referred to in this description.

As shown in FIG. 5, the mobile terminal 100 (the controller 180) receives or transmits a message from or to another terminal through the mobile communication module 112 (S510). Further, the message may be a short message service (SMS) message, a multimedia messaging system (MMS) message, email message, etc.

The controller 180 then recognizes a message type of the received and transmitted messages (S520). In more detail, the message type includes, for example, at least one of a reply message, a forwarded message, and a new message. The reply message corresponds to a message that is replied in response to a received message, a forwarded message corresponds to a message that is forwarded to a third mobile terminal, and a new message corresponds to a newly created message prepared independently of other messages.

Therefore, the controller 180 of the mobile terminal 100 can recognize or determine the message type of received, transmitted or new messages. In more detail, in one example, the controller 180 determines the message type of a received message by using message type information defined in a packet field of the receiving message.

Figure 6A:
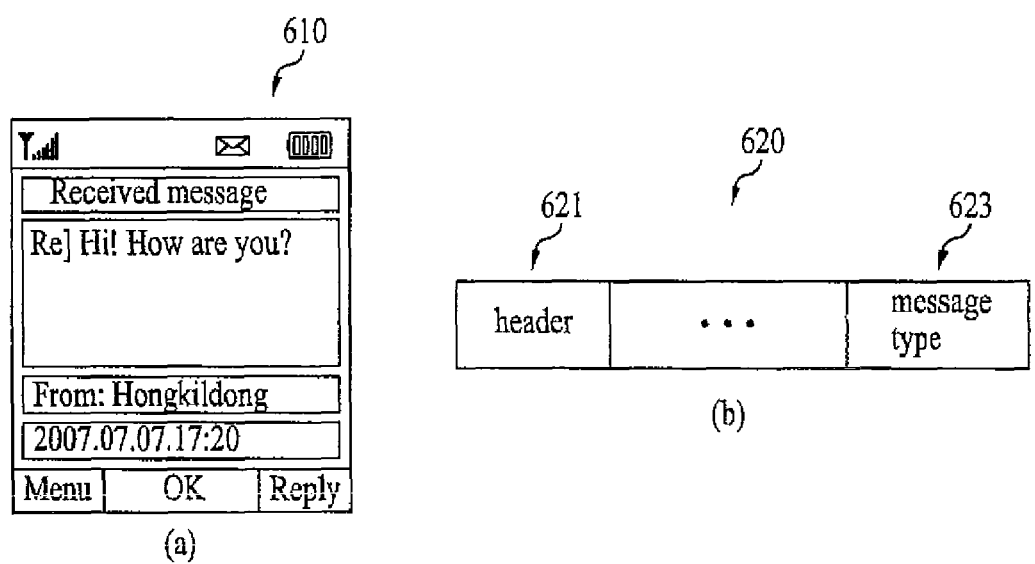
FIG. 6A(a) is an overview of a display screen displaying a message type of a received message in a mobile terminal according to one embodiment of the present invention.

For example, FIG. 6A(a) is an overview of a display screen 610 indicating the received message in a Reply message (identified as "Re]"). The controller 180 can determine whether the received message is a Reply message or other type of message by examining the received data packets corresponding to the received message.

For example, as shown FIG. 6A(b), the message type information of the received message can be defined in either a header field 621 of a packet 620 or a message type field 623, which is a separate field for defining the message type. Therefore, the controller 180 can determine the message type by referring to this information.

That is, as shown in FIG. 6A(a), the controller 180 determines the received message as a reply message and displays the recognized message using the identification 'Re]' when the message type defined in the packet field 621 or the message type field 623 is the reply message.

Next, FIG. 6B is an overview of display screens illustrating a method of identifying different message types of a received message according to another embodiment of the present invention. As shown in FIG. 6B(a), the user of the terminal 100 prepares and transmits a message to the user 'Hongkildong' 631. As shown in FIG. 6B(b), the user of the terminal 100 receives a reply from the user 'Hongkildong' 641. Note that the user 'Hongkildong' is giving the different reference numerals 631 and 641 to distinguish between mail being sent and received from the user 'Hongkildong', respectively.

Thus, as shown in FIG. 6B(b), the mobile terminal 100 can determine the message type based on the fields of the received messages. Therefore, the user of the mobile terminal 100 can immediately recognize the message type of the specific message as a reply message from the user 'Hongkildong'. That is, the user of the terminal 100 can recognize the received message as a reply message via the label "Re]."

Alternatively, as shown in FIG. 6B(c), the user of the mobile terminal 100 determines the message type of the received message as a reply message when the word 'Yes' 651 is included in the specific message. That is, the mobile terminal 100 can store particular keywords that are indicative of a particular type of message, and then use this information to determine the type of message.

Accordingly, when the received message includes the keyword, the controller 180 can determine the message type of the receiving message as a reply message. For example, the keyword may include a specific word (for example, yes, sure, so it is, etc.), a word which satisfies specific conditions (for example, a reply word, a greeting word, a word repeated with a transmitted message, etc.), and a reply identifier (for example, "Re:"). The different keywords may also be advantageously set by a user or may be automatically set by the mobile terminal 100.

FIG. 6B(d) illustrates another variation of determining the type of received message. That is, in this variation, since the specific message has been received within 'twenty minutes'] of the transmitted message (i.e., the message transmitting time is 17:10 in FIG. 6B(a) and the message is received at 17:20 as shown in the time display area 661), the controller 180 can advantageously determine the message type of the specific message as a reply message.

Further, the reply setup time corresponds to a time that the mobile terminal 100 can determine a received message is a reply message to a previously sent message. In addition, the reply setup time may be set by the user or may be automatically set by the mobile terminal 100.

Figure 7A:
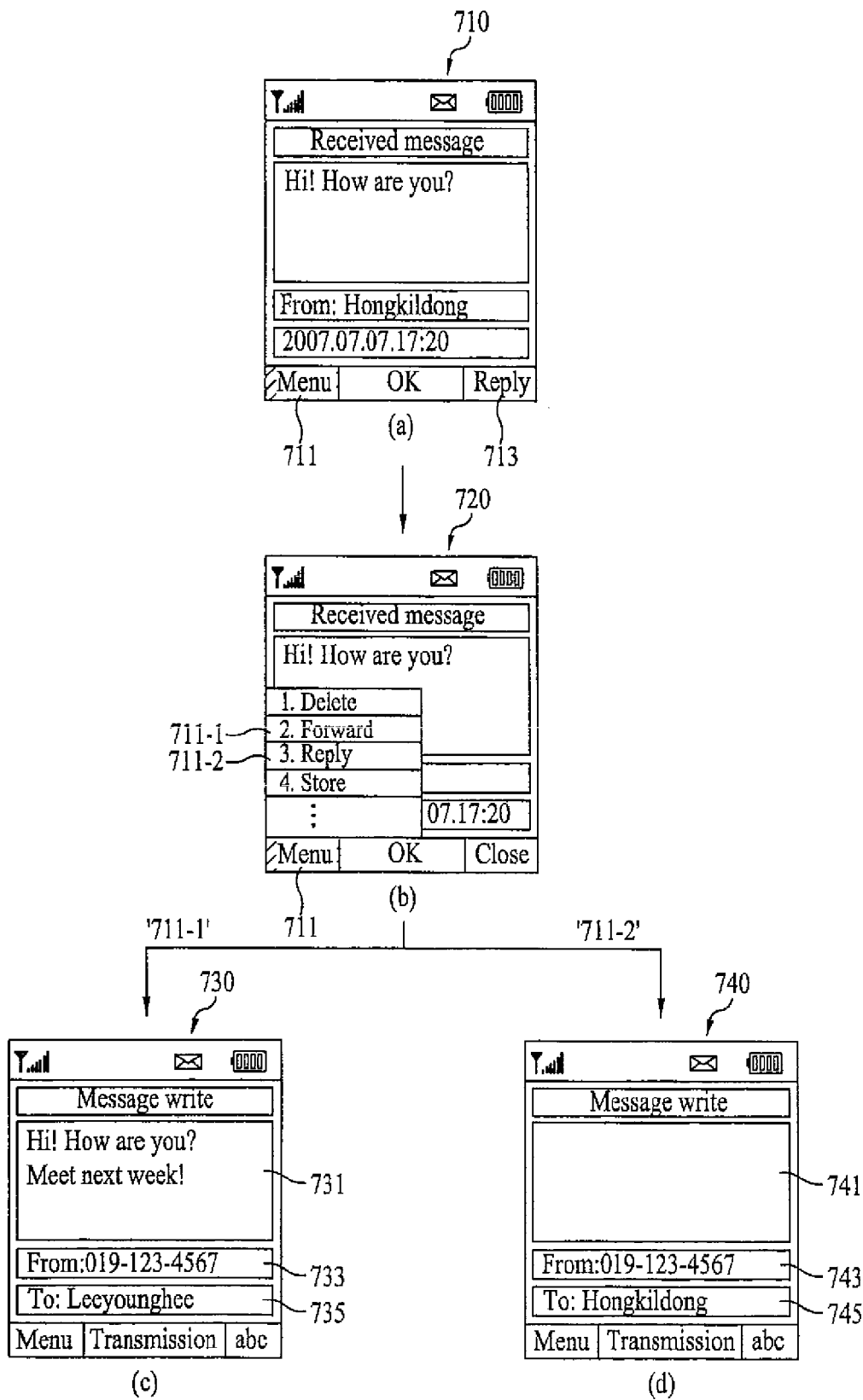
FIG. 7A is an overview of display screens illustrating a method for transmitting a received message in a mobile terminal according to an embodiment of the present invention.
Figure 7B:
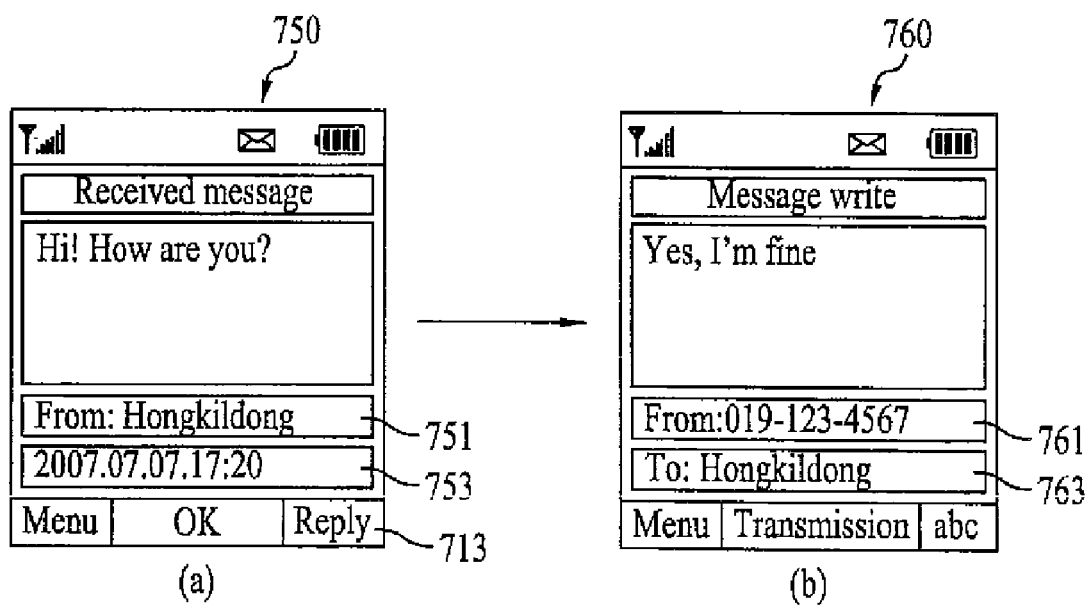
FIG. 7B is an overview of display screens illustrating a method for transmitting a received message in a mobile terminal according to another embodiment of the present invention.

Next, FIGS. 7A and 7B are overviews of display screens illustrating a method for transmitting a received message according to one embodiment of the present invention. As shown in the display screen 710 in FIG. 7A(a), the user of the mobile terminal 100 displays contents of a received message and information about the receiving message (e.g., information about a name of a user who sent the message, the receiving time, etc.).

Further, as shown, the display screen 710, also includes a menu key option 711, an OK key option, and a reply key option 713. Thus, when the user selects one of the displayed options, the mobile terminal 100 performs the corresponding function. For example, and as shown in FIG. 7A(b), when the user selects the menu key option 711 in FIG. 7A(a), the mobile terminal 100 displays a pop-up menu option that includes a forward option 711-1 and a reply option 711-2 in the display screen 720.

As shown in the display screen 730 in FIG. 7A(c), the mobile terminal 100 executes the forward function when the user selects the forward option 711-1. That is, the display screen 730 includes a text area 731 where the user can input information to be forwarded to the forwarded user, a window region 733 that includes the phone number of the mobile terminal 100, and a window 735 including a name of a user that the message is to be forwarded to.

Accordingly, the mobile terminal 100 can forward the prepared message and recognize the message type of the transmitted message as the forward message. In particular, the mobile terminal 100 may display and transmit information (contents of the receiving message, transmitting mobile terminal information of the receiving message, etc.) of the received message referred to in the forwarded message in accordance with the user's selection.

Furthermore, when the user selects the reply option 711-2 in FIG. 7A(b), the mobile terminal 100 displays the display screen 740 allowing the user to reply to the received message as shown in FIG. 7A(d). As shown in FIG. 7A(d), the display screen 740 includes a message writing area 741, a window 743 including the phone number of the terminal 100, and a window 745 including the name of the person the message is being replied to (i.e., 'Hongkildong').

Accordingly, the mobile terminal 100 can recognize the message type of the message prepared and transmitted in the state (d) as the reply message. Further, when the 'reply' key region 713 is activated in the display screen 710 in FIG. 7A(a), the mobile terminal 100 may directly display the display screen 740 in FIG. 7A(d) without first displaying the screen 720 in FIG. 7A(b).

For example, FIG. 7B(a) illustrates the mobile terminal 100 showing the display screen 750 that corresponds to a message received from a user called "Hongkildong." As shown in FIG. 7B(a), the display screen 750 includes a window 751 including a name or phone number of the user the message was received from, and a window 753 including information about a date and time the message was received. The user can then select the Reply option 713 and the mobile terminal 100 displays the display screen 760 shown in FIG. 7B(b). Here, the user has entered the text "Yes, I'm fine" that is going to be replied to the user called "Hongkildong." As shown, the display screen 760 includes the phone number of the terminal 100 in a window 761 and the name of the user the message is being sent to in the window 763.

Accordingly, the mobile terminal 100 can transmit the message prepared in the state (b) and recognize the message type of the transmitted message as the reply message. Alternatively, if the message prepared in the state (b) is transmitted within a certain time period from the receiving time of the receiving message displayed in state (a), the mobile terminal 100 can recognize the message type of the transmitted message as the reply message.

Referring again to FIG. 5, the mobile terminal 100 stores the transmitted message transmitted through the mobile communication module 112 or the received message received through the mobile communication module 112 in the memory 160 (S530).

Further, as discussed above, the message types of the stored messages can also be displayed. In more detail, the mobile terminal 100 enters a message search mode in accordance with the user's selection (S540), and displays a message list in which a message type per message is displayed (S550).

In addition, the message search mode is a state for searching the received or transmitted messages stored in the memory 160. The message search mode may include a receiving message search mode for searching the received messages or a transmitting message search mode for searching the transmitted messages. That is, the mobile terminal can independently enter the receiving and transmitting message search modes to separately search the received and transmitted messages.

Furthermore, a name of at least one message in the message list, and contents of the beginning of the message or brief information of the message (for example, transmitting and receiving mobile terminal information, transmission and reception time, etc.) are displayed in the message list. In addition, the message type can be displayed for each message on the message list by using at least one of icon, text, and symbol.

The display step (S550) can include displaying a message type list including at least one message type as the mobile terminal enters the message search mode, selecting any one message type using the displayed message type list, and displaying a message list including at least one message corresponding to the selected message type.

In FIG. 5, the user selects a message corresponding to a specific message type (S560), and the mobile terminal 100 displays contents of the selected message through the display module 151 (S570).

Figure 8A:
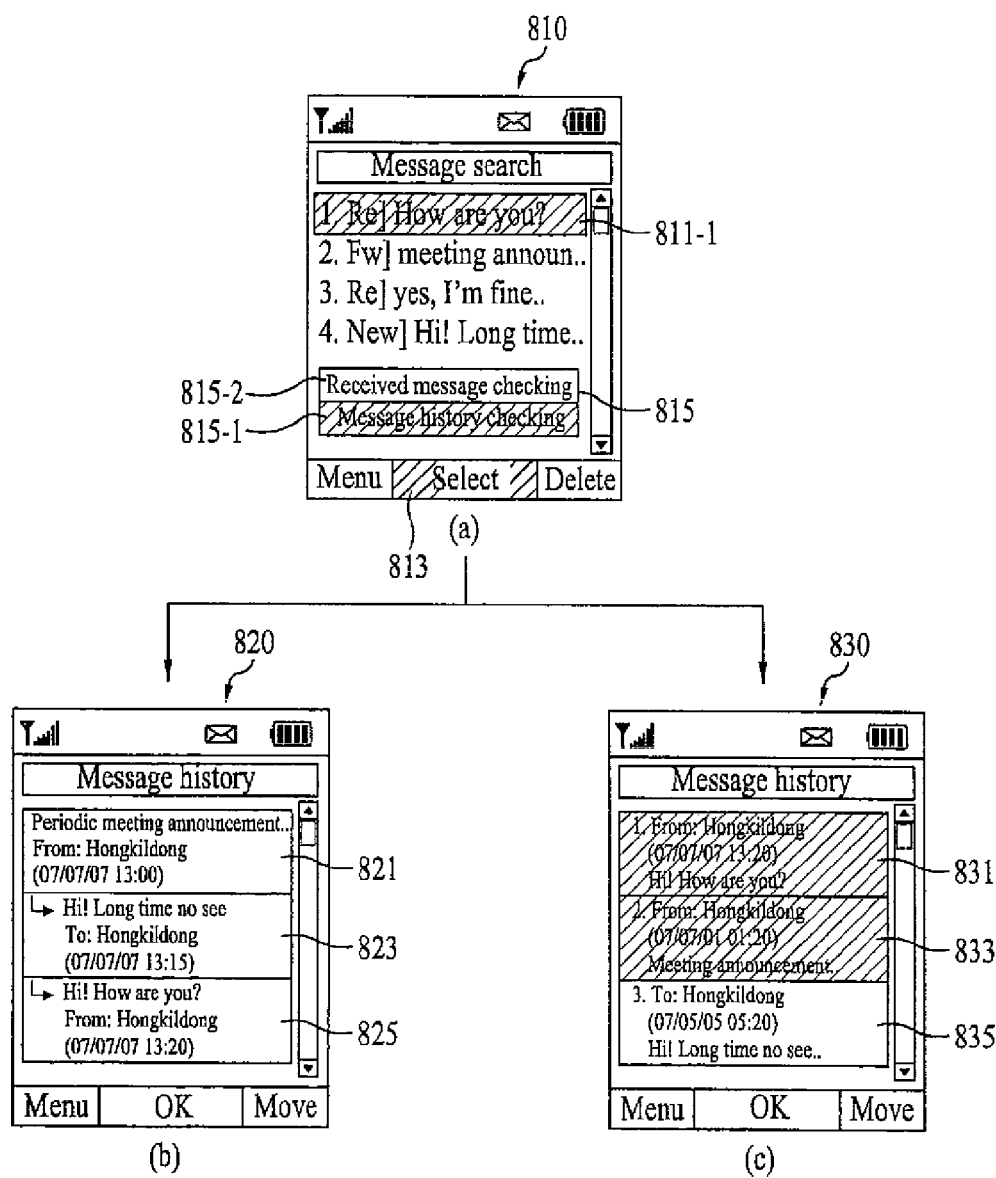
FIG. 8A is an overview of display screens illustrating a method of displaying a history of a reply message in a mobile terminal according to an embodiment of the present invention.
Figure 8B:
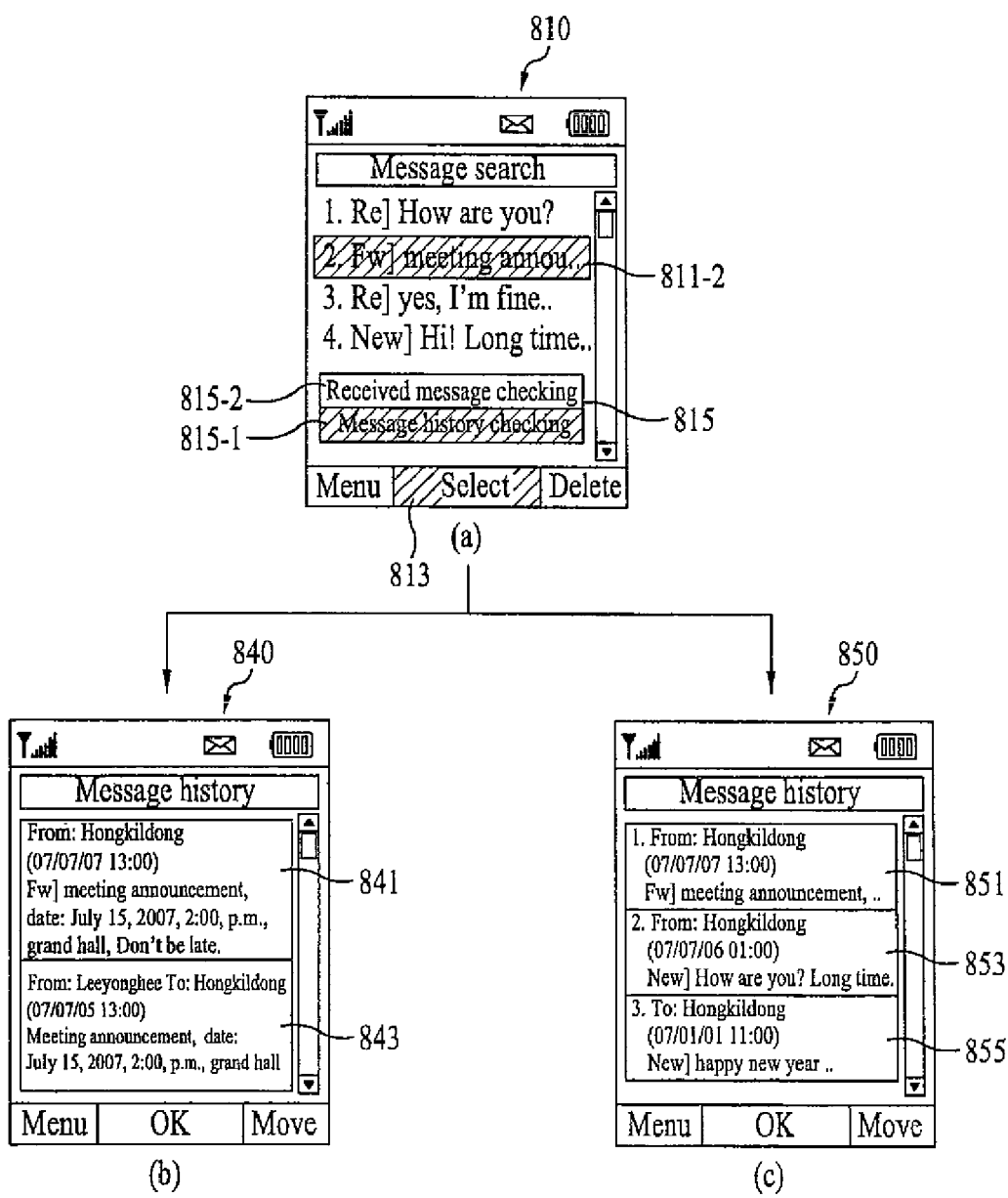
FIG. 8B is an overview of display screens illustrating a method of displaying a history of a forwarded message in a mobile terminal according to an embodiment of the present invention.
Figure 8C:
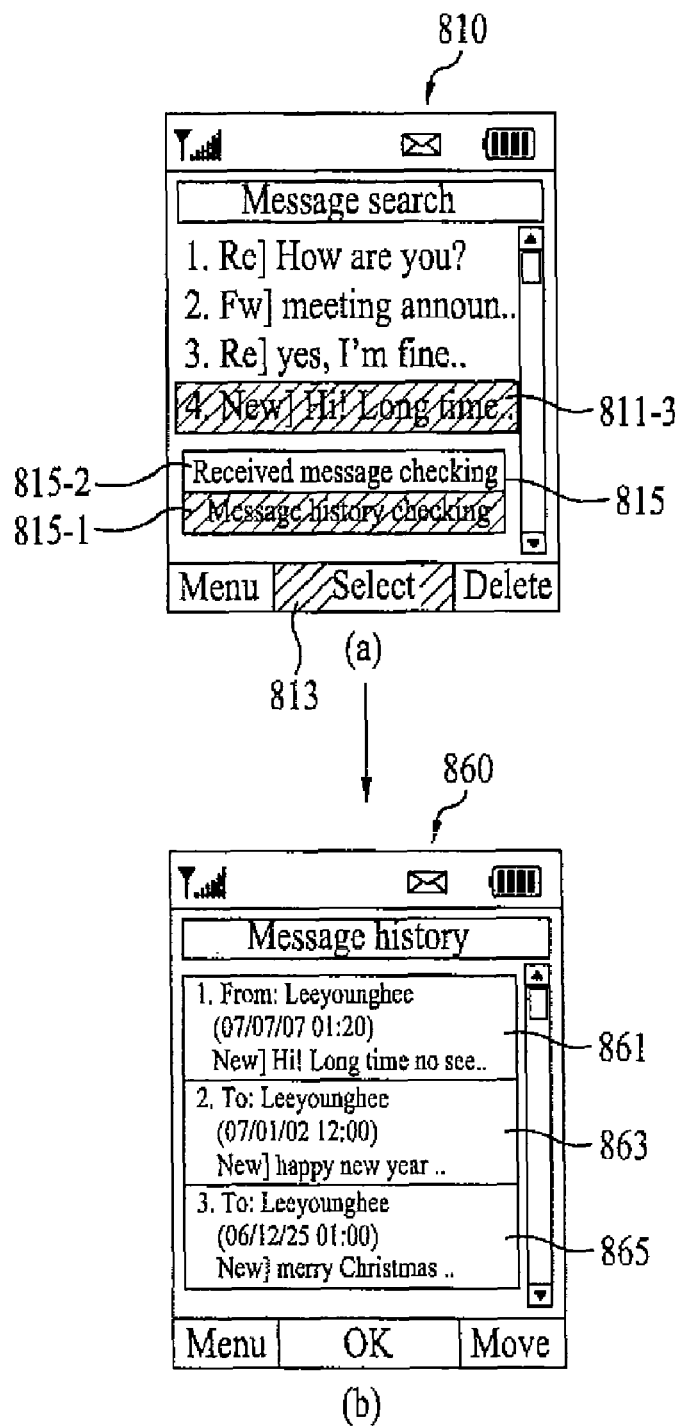
FIG. 8C is an overview of display screens illustrating a method of displaying a history of a new message in a mobile terminal according to one embodiment of the present invention.

Next, FIGS. 8A to 8C are overviews of display screens illustrating a method of displaying a history of selected messages. In this description, it is assumed that the mobile terminal 100 has already entered the receiving message search mode. A similar description also applies to the transmitting message search mode.

As shown in FIG. 8A(a), the mobile terminal 100 displays a display screen 810 including a message list having a plurality of received messages when entering the receiving message search mode. As shown in this example, a message type is displayed for each of the received messages in the message list. In more detail, the message type "Re]" means a "reply message," "Fw]" means a "forward message," and "New]" means a "new message."

In FIG. 8A(a), the user has selected the first message 811-1 in the list and the selected message is highlighted. The user can select a corresponding message by selecting the select option 813, by touching the corresponding message when the display is a touch screen, by using directional and selection keys on the terminal, using voice activation commands, etc. Once the particular message is selected or highlighted, the mobile terminal 100 displays a window 815 including a received message checking option 815-2 to view the contents of the first message 811-1 and a message history checking option 815-1 to view a message history related to the first message 811-1.

When the user selects the message history checking option 851-1 and selects the select option 813, the mobile terminal 100 displays the message history related to the first message 811-1 as shown in the display screen 820 in FIG. 8A(b).

As shown in FIG. 8A(b), the history of the selected message includes a first message 821 received from the user called "Hongkildong" on the uppermost part of the display screen 820, a second message 823 transmitted to the user "Hongkildong" as a reply of the first message, and a third message received from the user "Hongkildong" (i.e., a reply of the second message).

Further, the controller 180 can display the message history in the order of the recent transmitting and receiving time. Also, the message history may be displayed in such a manner that the message transmitted by the mobile terminal 100 and the message received by the mobile terminal 100 are distinguished from each other in the message history.

Further, the controller 180 can also display the history for the selected message as shown in the display screen 830 in FIG. 8A(c). That is, when the user selects the message history checking option 851-1 for the first message 811-1, the controller 180 of the mobile terminal 100 displays the message history related to the user (or mobile terminal) that transmitted the first selected message.

For example, as shown in the display screen 830, the mobile terminal 100 displays the user of the mobile terminal that transmitted the first message 811-1 (in the window 831) and contents of the messages transmitted and received for a certain time period in the order of the recent transmitting and receiving times. For example, the displays screen 830 illustrates the transmitted messages from the user "Hongkildong" that transmitted the first message 811-1 (see the windows 831 and 832 in FIG. 8A(c)) and displays the received message to the user "Hongkildong" as shown in the window 835. Thus, all transmitted and received messages are displayed for the user or mobile terminal that was responsible for the first selected message.

Therefore, the message history can be advantageously displayed in the order of the past transmitting and receiving times. Also, the message history may be displayed in such a manner that the message transmitted by the mobile terminal 100 and the message received from the mobile terminal 100 are distinguished from each other in the message history (as shown by the highlighted transmitted messages in FIG. 8A(c)).

Next, FIG. 8B illustrates an embodiment where the user selects the second message 811-2 (a forwarded message) in the display screen 810. Then, when the user selects the select option 813, the controller 180 of the mobile terminal 100 displays the pop-up window 815 allowing the user to select the received message checking option 815-2 or the message history checking option 815-1.

Then, when the user selects the message history checking option 815-1, the controller 180 displays the display window 840 shown in FIG. 8B(b). As shown, the display window 840 includes the message history related to the second message 811-2 in which the contents 841 of the second message 811-2 are displayed, and contents 843 of the original message referred to by the second message 811-2 and transmitting and receiving mobile terminal information of the original message are displayed below the contents 841 of the second message 811-2. Accordingly, the user can identify the contents of the forwarded message and the contents of the original message referred to in the forwarded message.

Furthermore, FIG. 8B(c) illustrates the mobile terminal displaying a display screen 850 when the user selects the message history checking option 851-1. As shown, the display screen 850 includes a message history related to the user "Hongkildong" of the mobile terminal that transmitted the second message 811-2.

For example, the display screen 850 includes the mobile terminal (i.e., user "Hongkildong") that forwarded the second message 811-2 and contents of the messages transmitted and received for a certain time period in the order of the recent transmitting and receiving times as shown in the windows 853 and 855. Therefore, the message history can be displayed in the order of the past transmitting and receiving times. The messages may also be displayed in such a manner that the messages transmitted by the mobile terminal 100 and the messages received from the mobile terminal 100 are distinguished from each other in the message history.

Next, FIG. 8C illustrates an embodiment in which the user selects a "New" message that is displayed in a display list. In more detail, as shown in FIG. 8C(a), when the user selects the message 811-3, and then selects the selection option 813, the mobile terminal 100 displays the pop-up window 815 on the display screen 810 allowing the user to select the options 815-1 and 815-2 (similar to the above embodiments).

When the user selects the message history checking option 851-1, the mobile terminal 100 displays the message history related to the user of the mobile terminal that created the message 811-3 on the display screen 860. For example, as shown in FIG. 8C(b), the mobile terminal 100 displays the mobile terminal that transmitted the selected message 811-3 and contents of the messages transmitted and received for a certain time period in the order of the recent transmitting and receiving times. As discussed above, the message history may be displayed in the order of the past transmitting and receiving times. Also, the message history may be displayed in such a manner that the message transmitted by the mobile terminal 100 and the message received from the mobile terminal 100 are distinguished from each other on the message history.

Next, a method for displaying a message history using a message type list in a mobile terminal will be described with reference to FIG. 9. Further, this description also assumes the user has already requested the mobile terminal 100 enter into the receiving message search mode. A similar description also applies to to the transmitting message search mode.

As shown in FIG. 9(a), the mobile terminal 100 displays a display screen 910 including a message type list having a reply message option 911-1, a forwarded message option 911-2, and a new message option 911-3. The message type is also not limited to the aforementioned types, and may include additional message types. FIGS. 9(a), 9(b) and 9(c) respectively illustrate display screens 920, 930 and 940 corresponding to information that is displayed when the user selects the message options 911-1, 911-2 and 911-3.

In more detail, and as shown in FIG. 9(b), when the user selects the reply message option 911-1 from the message type list, the mobile terminal 100 displays a reply message list including reply messages, which have been received for a certain time period, through the mobile communication module 112.

Further, if the user selects any one of the displayed reply messages in FIG. 9(b), the mobile terminal 100 displays a pop-window allowing the user to check the selected reply message only or to check a message history related to the selected reply message (similar to the embodiment shown in FIG. 8A(a)). As mentioned above, if the user selects the "message history checking" option, the mobile terminal 100 can be operated in the states shown in FIGS. 8A(b) or 8A(c).

Next, as shown in FIG. 9(c), when the user selects the forwarded message option 911-2 from the message type list, the mobile terminal 100 displays a display screen 930 including a forward message list having only forwarded messages that are received in a certain time period through the mobile communication module 112.

Also, if the user selects any one of the forwarded messages from the forwarded message list, the mobile terminal 100 displays a pop-up window allowing the user to check the selected reply message only or to check a message history related to the selected reply message (similar to the embodiment shown in FIG. 8A(a)). As mentioned above, if the user selects the "message history checking" option, the mobile terminal 100 can be operated in the states shown in FIGS. 8A(b) or 8A(c).

Next, as shown in FIG. 9(d), if the user selects the new message 911-3 from the message type list, the mobile terminal 100 displays a display screen 940 including a new message list having only new messages that are received within a certain time period through the mobile communication module 112.

Similar to the above description with respect to FIGS. 9(b) and 9(c), if the user selects any one of the new messages from the message list, the mobile terminal 100 displays a pop-up window allowing the user to check the selected new message only or to check a message history related to the selected new message (similar to the embodiment shown in FIG. 8A(a)). In adition, if the user selects the "message history checking" option, the mobile terminal 100 can be operated in the states shown in FIGS. 8A(b) or 8A(c).

In addition, the above various embodiments may be implemented in a computer-readable medium using, for example, computer software, hardware, or some combination thereof. For a hardware implementation, the embodiments described above may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof.

For a software implementation, the embodiments described herein may be implemented with separate software modules, such as procedures and functions, each of which perform one or more of the functions and operations described herein. The software codes can be implemented with a software application written in any suitable programming language and may be stored in memory (for example, the memory 160), and executed by a controller or processor (for example, the controller 180).

In addition, the mobile terminal 100 may be implemented in a variety of different configurations. Examples of such configurations include a folder-type, slide-type, bar-type, rotational-type, swing-type and combinations thereof.

As described above, the mobile terminal and corresponding method for displaying messages according to embodiments of the present invention have several advantages.

First, because the message type per message is displayed on the message list, the user can easily identify the type of the message without having to first open the contents of the message.

Secondly, the message history related to a selected message can be displayed through one screen.

Thirdly, the message history related to the mobile terminal that has transmitted and received the messages corresponding to the selected message type can be displayed through one screen.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for displaying a message in a mobile terminal, the method comprising:
    selecting a message history option on an input unit of the mobile terminal;
    displaying a list of messages;
    recognizing a message type of at least one message included in the displayed list of messages based on user-specific transmission and reception history corresponding to the at least one message; and
    displaying the message type.

2. The method of claim 1, wherein the step of displaying the message type displays the message type for each message in the displayed list of messages.

3. The method of claim 1, further comprising:
    entering a message search mode to search for the list of messages based on the step of selecting the message history option,
    wherein the step of displaying the list of messages and the displaying the message type display the list of messages and the message type after the message search mode has been entered.

4. The method of claim 3, wherein the message search mode includes at least one of a receiving message search mode for searching for a list of received messages and a transmitting message search mode for searching for a list of transmitted messages.

5. The method of claim 1, wherein the message type includes at least one of a reply message, a forward message, and a new message.

6. The method of claim 1, wherein the step of displaying the message type displays the message type using at least one of an icon, a text and a symbol.

7. The method of claim 1, further comprising:
    selecting the displayed message type from the displayed list of message types; and
    displaying messages and message types that are related to the selected message type.

8. The method of claim 1,
    wherein the step of recognizing the message type recognizes, when the message is a received message, the message type as a reply message using message type information defined in the message, using keywords included in contents of the message, or using a predetermined reply time period between when the received message was received and when a message corresponding to the received message was transmitted.

9. The method of claim 1,
    wherein the step of recognizing the message type recognizes, when the message is a transmitted message, the message type as a reply message using message type information defined in the message, using keywords included in contents of the message, or using a predetermined reply time period between when the transmitted message was transmitted and when a message corresponding to the transmitted message was received.

10. The method of claim 1, further comprising:
    selecting the at least one displayed message or the corresponding displayed message type; and
    executing a message history option for displaying a message history of the selected message.

11. The method of claim 10, wherein the step of executing the message history option comprises:
    displaying a first message and at least a second message included in the message history of the selected message in a time order series.

12. The method of claim 10, wherein the step of executing the message history option comprises:
    displaying a first message and at least a second message included in the message history of the selected message based on an address of a mobile terminal that produced the first message.

13. The method of claim 10, wherein the step of executing the message history option comprises:
    displaying a pop-up menu including the option for displaying the message history of the selected message.

14. The method of claim 10, wherein the step of executing the message history option comprises:
    automatically displaying the message history of the selected message when a button on the terminal is manipulated.

15. A mobile terminal, comprising:
    a communication unit configured to wirelessly communication with at least one other terminal;
    a display unit configured to display information;
    an input unit configured to input information into the mobile terminal; and
    a control unit configured to control the display unit to display a list of messages, to recognize a message type of at least one message included in the displayed list of messages based on user-specific transmission and reception history corresponding to the at least one message, and to display the message type based on a message history instruction input on the input unit.

16. The mobile terminal of claim 15, wherein the control unit is further configured to control the display unit to display the message type for each message in the displayed list of messages.

17. The mobile terminal of claim 15, wherein the input unit is further configured to receive input to enter a message search mode to search for the list of messages, and
    wherein the control unit is further configured to control the display unit to display the list of messages and the message type after the message search mode has been entered.

18. The mobile terminal of claim 17, wherein the message search mode includes at least one of a receiving message search mode for searching for a list of received messages and a transmitting message search mode for searching for a list of transmitted messages.

19. The mobile terminal of claim 15, wherein the message type includes at least one of a reply message, a forward message, and a new message.

20. The mobile terminal of claim 15, wherein the control unit is further configured to control the display unit to display the message type using at least one of an icon, a text and a symbol.

21. The mobile terminal of claim 15, wherein the input unit is further configured to receive an input signal corresponding to a selection of the displayed message type from the displayed list of message types, and
wherein the control unit is further configured to control the display unit to display messages and message types that are related to the selected message type.

22. The mobile terminal of claim 15, wherein the control unit is further configured to control the display unit to recognize, when the message is a received message, the message type as a reply message using message type information defined in the message, using keywords included in contents of the message, or using a predetermined reply time period between when the received message was received and when a message corresponding to the received message was transmitted.

23. The mobile terminal of claim 15, wherein the control unit is further configured to control the display unit to recognize, when the message is a transmitted message, the message type as a reply message using message type information defined in the message, using keywords included in contents of the message, or using a predetermined reply time period between when the transmitted message was transmitted and when a message corresponding to the transmitted message was received.

24. The mobile terminal of claim 15, wherein the control unit is further configured to receive an input selecting for selecting the at least one displayed message or the corresponding displayed message type, and
wherein the control unit is further configured to execute a message history option for displaying a message history of the selected message.

25. The mobile terminal of claim 24, wherein the control unit is further configured to control the display unit to display a first message and at least a second message included in the message history of the selected message in a time order series.

26. The mobile terminal of claim 24, wherein the control unit is further configured to control the display unit to display a first message and at least a second message included in the message history of the selected message based on an address of a mobile terminal that produced the first message.

27. The mobile terminal of claim 24, wherein the control unit is further configured to control the display unit to display a pop-up menu including the option for displaying the message history of the selected message.

28. The mobile terminal of claim 24, wherein the control unit is further configured to control the display unit to display automatically display the message history of the selected message when a button on the terminal is manipulated.

* * * * *